(12) United States Patent
Tamura et al.

(10) Patent No.: US 11,473,908 B2
(45) Date of Patent: Oct. 18, 2022

(54) ULTRASONIC INSPECTION SYSTEM

(71) Applicant: Hitachi-GE Nuclear Energy, Ltd., Hitachi (JP)

(72) Inventors: Akinori Tamura, Tokyo (JP); Naoyuki Kouno, Tokyo (JP); Tetsuya Matsui, Tokyo (JP); Shinobu Ookido, Hitachi (JP); Hiroshi Hanaki, Hitachi (JP); Hiroshi Okazawa, Hitachi (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 781 days.

(21) Appl. No.: 16/439,254

(22) Filed: Jun. 12, 2019

(65) Prior Publication Data
US 2019/0383604 A1 Dec. 19, 2019

(30) Foreign Application Priority Data
Jun. 13, 2018 (JP) .............................. JP2018-112535

(51) Int. Cl.
*G01B 17/02* (2006.01)
(52) U.S. Cl.
CPC .................................... *G01B 17/02* (2013.01)
(58) Field of Classification Search
CPC ........ G01B 17/02; G01B 17/00; G01B 21/08; G01B 7/06; G01B 11/06; G01B 7/105; G01N 2291/02854; G01N 2291/102; G01N 2291/101; G01N 29/07; G01N 29/30

See application file for complete search history.

(56) References Cited

FOREIGN PATENT DOCUMENTS

JP 2015-78910 A 4/2015

*Primary Examiner* — Tarun Sinha
(74) *Attorney, Agent, or Firm* — Crowell & Moring LLP

(57) ABSTRACT

An ultrasonic inspection system includes an ultrasonic sensor which includes a piezoelectric element to transmit and receive an ultrasonic wave and a calibration piece, and a control device. The calibration piece includes a propagation portion extending along an upper surface of the piezoelectric element, and a propagation redirecting portion which is formed on one side in an extending direction of the propagation portion, and is connected to the piezoelectric element through a heat resistant adhesive. The propagation redirecting portion includes a slope inclined in a vertical direction to the upper surface of the piezoelectric element. The propagation redirecting portion is configured to reflect the ultrasonic wave incident on the propagation redirecting portion from the piezoelectric element on the slope and emit the ultrasonic wave toward the propagation portion, and reflect the ultrasonic wave which is reflected on an end surface on the other side in the extending direction of the propagation portion and incident on the propagation redirecting portion from the propagation portion on the slope and emit the ultrasonic wave toward the piezoelectric element.

5 Claims, 14 Drawing Sheets

ULTRASONIC INSPECTION SYSTEM

BACKGROUND OF THE INVENTION

1. Field of the Invention

The invention relates to an ultrasonic inspection system which measures a thickness of a subject.

2. Description of the Related Art

Ultrasonic inspection, which is one of non-destructive examination technologies, has a low cost and ease of application, and thus is employed in a wide range of fields. In nuclear power plants, thermal power plants and chemical plants, the ultrasonic inspection for measuring the thickness of pipes and containers is periodically performed to ensure the soundness thereof. Specifically, after removing a heat insulating material from the pipe and the container, an ultrasonic sensor is pressed against a predetermined inspection point to perform the ultrasonic inspection. Therefore, it is necessary to attach and detach the heat insulating material before and after inspection. If the inspection place is at a high place, it is necessary to assemble and remove a foothold before and after inspection. In addition, since the ultrasonic sensor is manually pressed against the pipe and the container, it is necessary to carefully arrange the ultrasonic sensor so that a propagation direction of ultrasonic waves is appropriate. Nuclear power plants require a great deal of labor and time to inspect a large number of pipes and containers.

For example, there is proposed a method in which the ultrasonic sensor is fixed to the surface of a pipe under the heat insulating material in advance. With this method, the ultrasonic inspection can be performed without attaching or detaching the heat insulating material. In addition, if the ultrasonic inspection is performed during the operation of the plant, it is possible to reduce a load of a periodic inspection. However, in the method, the ultrasonic sensor is fixed to the surface of the pipe under the heat insulating material. Therefore, it is hard to calibrate the machine before and after the measurement while preparing a calibration plate separately as in the related art. Therefore, there is disclosed a method for assembling a calibration plate with known material and thickness to the ultrasonic sensor (for example, JP 2015-078910 A).

An ultrasonic wave measurement device disclosed in JP 2015-078910 A includes the ultrasonic sensor fixed to the surface of the pipe and a flew detector. For example, as illustrated in FIG. 7 of JP 2015-078910 A, the ultrasonic sensor includes a piezoelectric element which transmits and receives the ultrasonic wave, and the calibration plate which is fixed to the upper surface (that is, a surface on the opposite side of the pipe) of the piezoelectric element. The flew detector calculates a thickness of the pipe on the basis of a propagation time of the ultrasonic wave reflected one time on the inner surface (that is, a surface on the opposite side of the piezoelectric element) of the pipe. In addition, since the thickness and the material of the calibration plate are already known, the flew detector calibrates a time axis on the basis of the propagation time of the ultrasonic wave reflected one time on the upper surface (that is, a surface on the opposite side of the piezoelectric element) of the calibration plate.

SUMMARY OF THE INVENTION

The technique in the related art described above has the following problems. For example, as illustrated in FIG. 8B of JP 2015-078910 A, in a case where the calibration plate is relatively thin, a reception timing of the ultrasonic wave reflected one time on the upper surface of the calibration plate comes earlier than a reception timing of the ultrasonic wave reflected one time in the inner surface of the pipe. Therefore, the reception timing of the ultrasonic wave (so-called multiple reflection wave) reflected plural times on the surface of the calibration plate is overlapped with or approaches the reception timing of the ultrasonic wave reflected one time in the inner surface of the pipe, and thus the former ultrasonic wave is likely to influence on the latter ultrasonic wave. Therefore, the thinning of the ultrasonic sensor can be achieved, but the measurement accuracy of the thickness of the pipe is degraded.

On the other hand, as illustrated in FIG. 8A of JP 2015-078910 A, in a case where the calibration plate is relatively thick, a reception timing of the ultrasonic wave reflected one time on the upper surface of the calibration plate comes later than a reception timing of the ultrasonic wave reflected one time in the inner surface of the pipe. Therefore, the reception timing of the ultrasonic wave reflected plural times on the surface of the calibration plate comes further later than the reception timing of the ultrasonic wave reflected one time in the inner surface of the pipe, and thus the former ultrasonic wave does not influence on the latter ultrasonic wave. Therefore, the measurement accuracy of the thickness of the pipe can be secured, but the thinning of the ultrasonic sensor is degraded.

The invention has been made in view of the above problems, and an object thereof is to provide an ultrasonic inspection system which can achieve both the thinning of the ultrasonic sensor and the securing of measurement accuracy of the thickness of the subject while the calibration piece is assembled to the ultrasonic sensor.

In order to achieve the object, according to a representative aspect of the invention, there is provided an ultrasonic inspection system. The ultrasonic inspection system includes an ultrasonic sensor which includes a piezoelectric element to transmit and receive an ultrasonic wave and a calibration piece and a control device which calibrates a time axis on the basis of a propagation time of the ultrasonic wave propagating in the calibration piece and a sound speed of the calibration piece, and calculates a thickness of a subject on the basis of a propagation time of the ultrasonic wave propagating in the subject and a sound speed of the subject. The calibration piece includes a propagation portion which extends along a surface of the piezoelectric element on a side opposite to the subject, and a propagation redirecting portion which is formed on one side in an extending direction of the propagation portion, and is connected to the surface of the piezoelectric element through a contact medium. The propagation redirecting portion includes a slope inclined in a vertical direction to the surface of the piezoelectric element, reflects the ultrasonic wave incident on the propagation redirecting portion from the piezoelectric element on the slope and emits to the propagation portion, reflects the ultrasonic wave on the slope which is reflected on an end surface on the other side in the extending direction of the propagation portion and incident on the propagation redirecting portion from the propagation portion and emits to the piezoelectric element.

According to the invention, both thinning of an ultrasonic sensor and securing of measurement accuracy of a thickness of a subject can be achieved while a calibration piece is assembled to an ultrasonic sensor.

DESCRIPTION OF THE PREFERRED EMBODIMENTS

A first embodiment of the invention will be described with reference the drawings.

Figure 1:
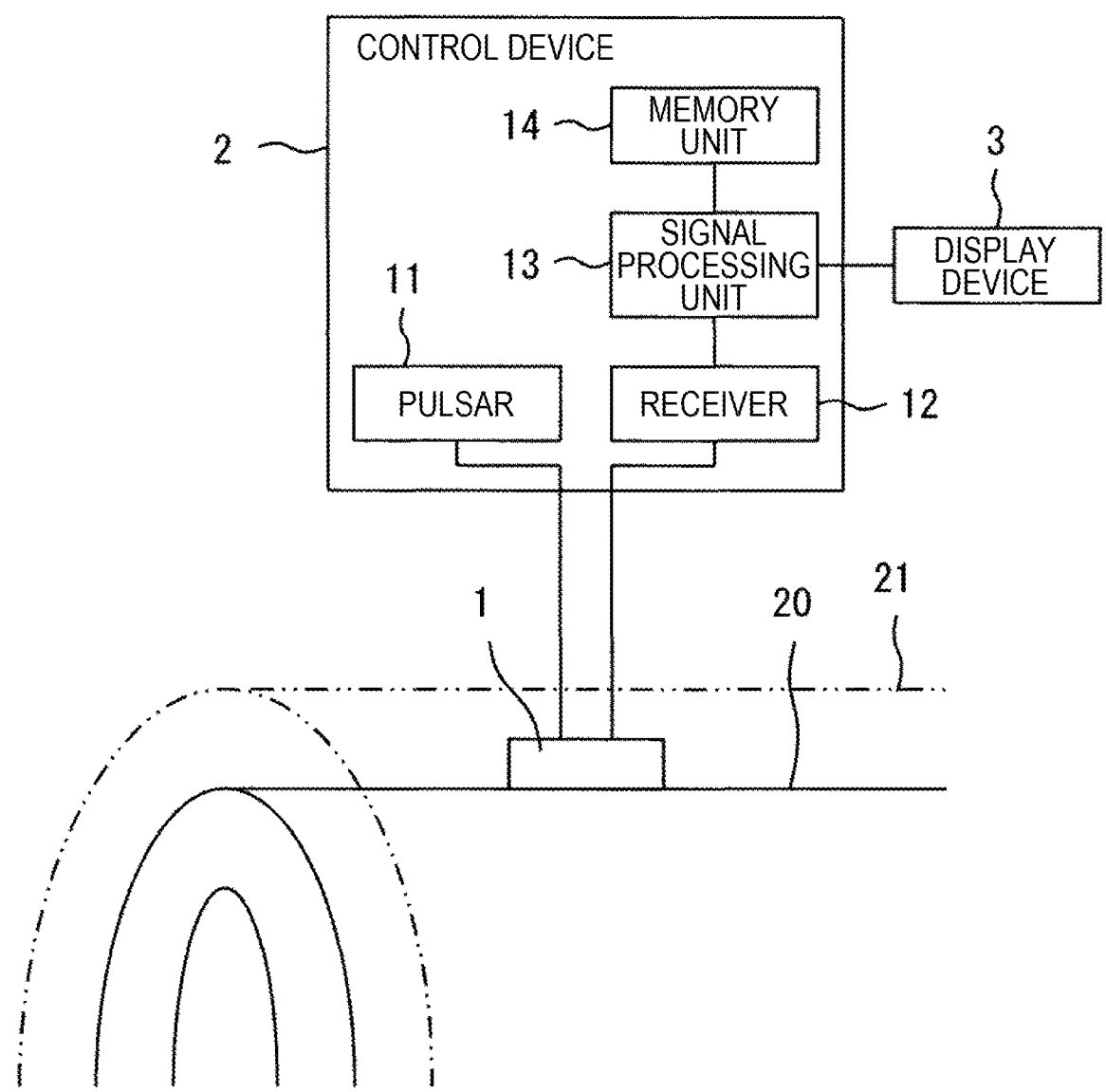
FIG. 1 is a diagram schematically illustrating a configuration of an ultrasonic inspection system in a first embodiment of the invention together with a pipe (subject)
Figure 2:
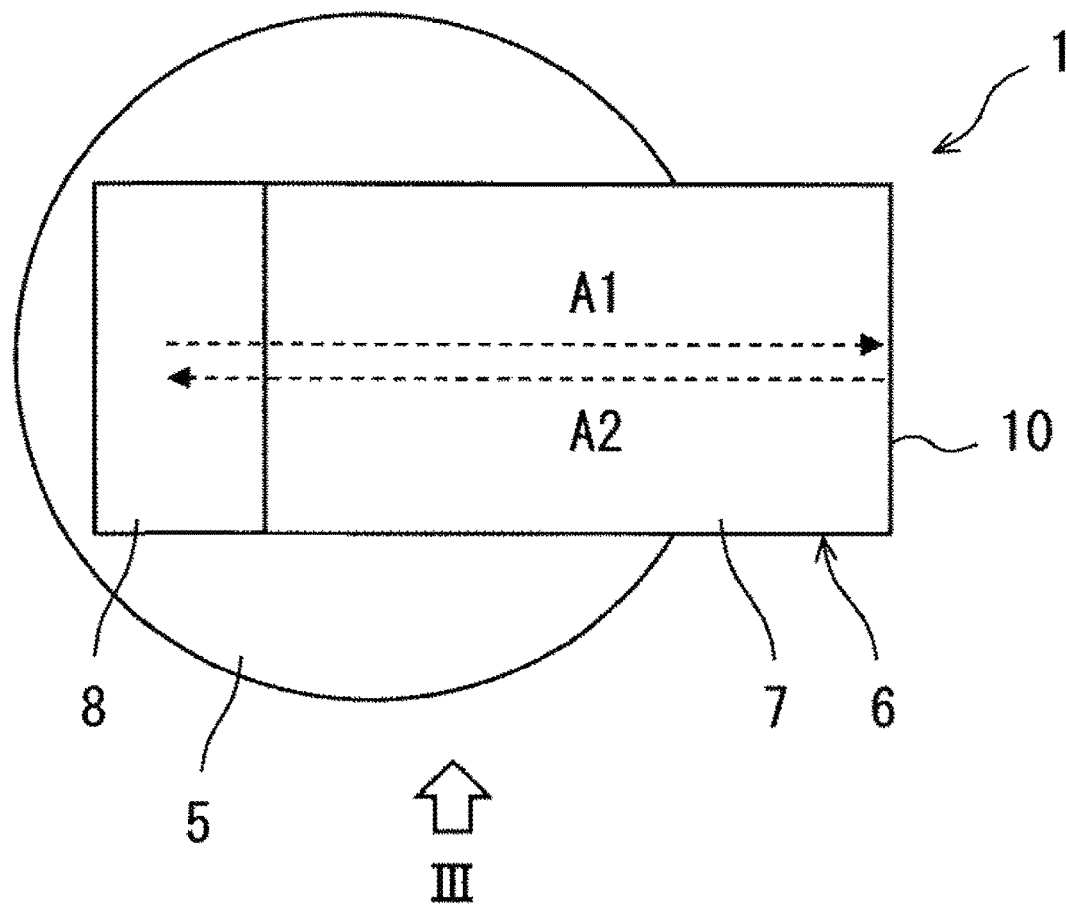
FIG. 2 is a top view illustrating a structure of an ultrasonic sensor in the first embodiment of the invention.
Figure 3:
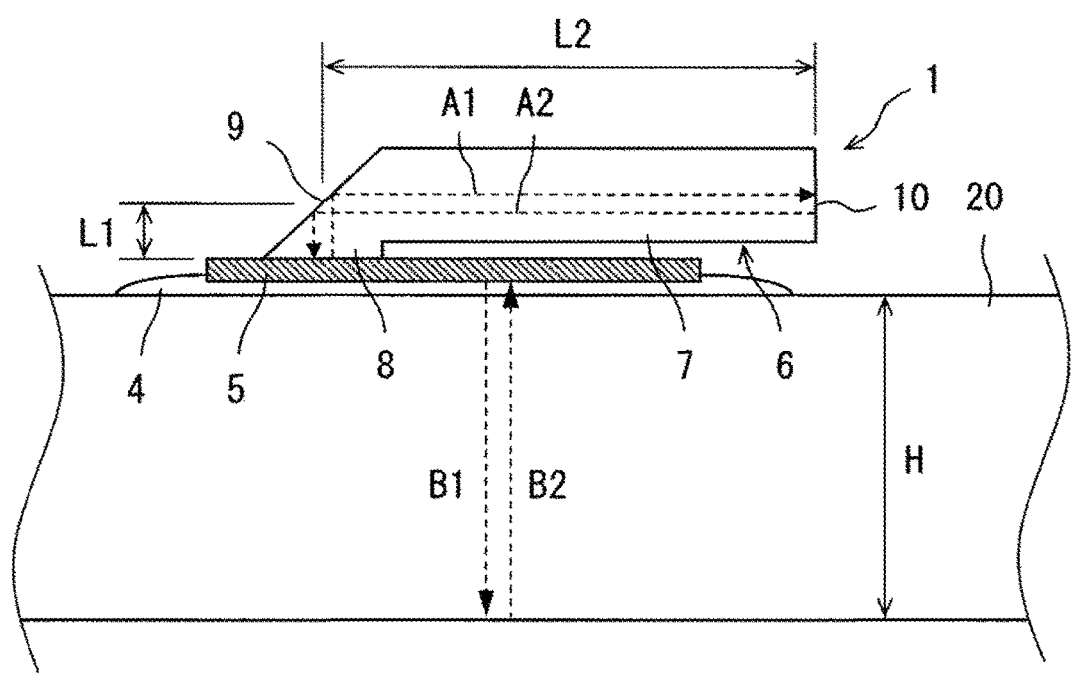
FIG. 3 is a diagram viewed from a direction of arrow III in FIG. 2.

FIG. 1 is a diagram schematically illustrating a configuration of an ultrasonic inspection system in this embodiment together with a pipe (subject). FIG. 2 is a top view illustrating a structure of the ultrasonic sensor in this embodiment. FIG. 3 is a diagram viewed from a direction of arrow III in FIG. 2.

A pipe 20 (subject) of this embodiment is made of, for example, carbon steel or stainless steel, and is heated to a high temperature while liquid and gas flow therein during the operation of a plant. Therefore, the pipe is covered with a heat insulating material 21 made of, for example, calcium silicate, rock wool, glass wool, amorphous water-kneading material, or rigid urethane foam.

The ultrasonic inspection system of this embodiment includes an ultrasonic sensor 1, a control device 2, and a display device 3 (display). The ultrasonic sensor 1 is fixed to the surface of the pipe 20 below the heat insulating material 21 through a heat resistant adhesive 4 (contact medium).

The ultrasonic sensor 1 includes a piezoelectric element 5 and the calibration piece 6 which is bonded to the upper surface (that is, a surface on the opposite side to the subject) of the piezoelectric element 5. The piezoelectric element 5 is made of a piezoelectric ceramic such as lead zirconate titanate. A material of the calibration piece 6 is desirably the same as the material of the pipe 20 (carbon steel or stainless steel), or may be ceramics such as aluminum, lead, titan, brass, or alumina.

The calibration piece 6 includes the propagation portion 7 of a square column shape extending in a direction (the right and left direction in FIGS. 2 and 3) along the upper surface of the piezoelectric element 5, and a propagation redirecting portion 8 which is formed in one side (the left side in FIGS. 2 and 3) in the extending direction of the propagation portion 7 and in a triangular column shape connected to the piezoelectric element 5 through the heat resistant adhesive 4 (see FIG. 6 below) Further, in FIG. 3, the propagation portion 7 of the calibration piece 6 is separated from the upper surface of the piezoelectric element 5, but the invention is not limited. In other words, even if the propagation portion 7 of the calibration piece 6 and the upper surface of the piezoelectric element 5 are adjacent, but an extremely-thin air layer exists therebetween, an ultrasonic wave is not propagated. Therefore, the contact medium does desirably not exist (this is true in the propagation portion of the other embodiments below).

The propagation redirecting portion 8 includes a slope 9 which is inclined in a vertical direction to the upper surface of the piezoelectric element 5. Then, as illustrated with arrow A1 in in FIGS. 2 and 3, the ultrasonic wave incident on the propagation redirecting portion 8 from the piezoelectric element 5 is reflected on the slope 9 and emitted toward the propagation portion 7. As illustrated with arrow A2 in FIGS. 2 and 3, the ultrasonic wave which is reflected on an end surface 10 on the other side (the right side in FIGS. 2 and 3) in the extending direction of the propagation portion 7 and incident from the propagation portion 7 to the propagation redirecting portion 8 is reflected on the slope 9 and emitted toward the piezoelectric element 5.

The control device 2 includes a pulsar 11, a receiver 12, a signal processing unit 13, and a memory unit 14. Further, the signal processing unit 13 is configured by a processor which performs a process according to a program. The memory unit 14 is configured by a hard disk and a memory.

The piezoelectric element 5 of the ultrasonic sensor 1 vibrates in a thickness direction by a drive signal (electrical signal) from the pulsar 11 of the control device 2, and transmits the ultrasonic wave to the calibration piece 6 and the pipe 20. In addition, the piezoelectric element 5 receives the ultrasonic wave A reflected one time on the end surface of the calibration piece 6 as illustrated with arrows A1 and A2 in FIG. 3, and the ultrasonic wave B reflected one time on the inner surface of the pipe 20 as illustrated with arrows B1 and B2 in FIG. 3. Then, the received ultrasonic waves A and B into a waveform signal (electrical signal) and are output to the receiver 12 of the control device 2.

Figure 4:
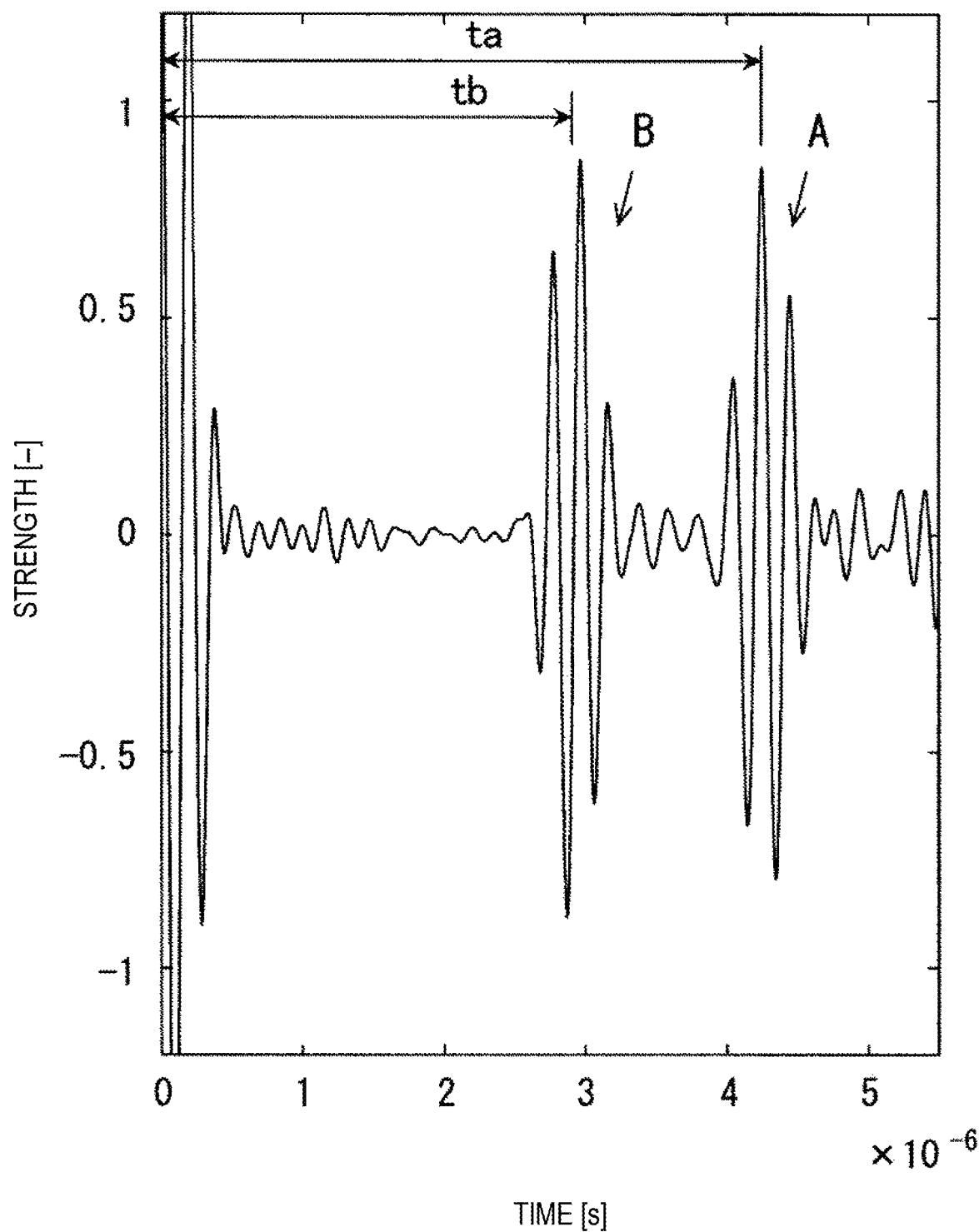
FIG. 4 is a diagram illustrating a specific example of a receiving waveform in the first embodiment of the invention.

The signal processing unit 13 of the control device 2 performs a predetermined process (specifically, a conversion process from an analog signal to a digital signal) on the waveform signal obtained through the receiver 12. With this configuration, as illustrated in FIG. 4, waveform data of the ultrasonic waves A and B is acquired. Then, the waveform data is output and stored in the memory unit 14, and output and displayed in the display device 3.

Figure 5:
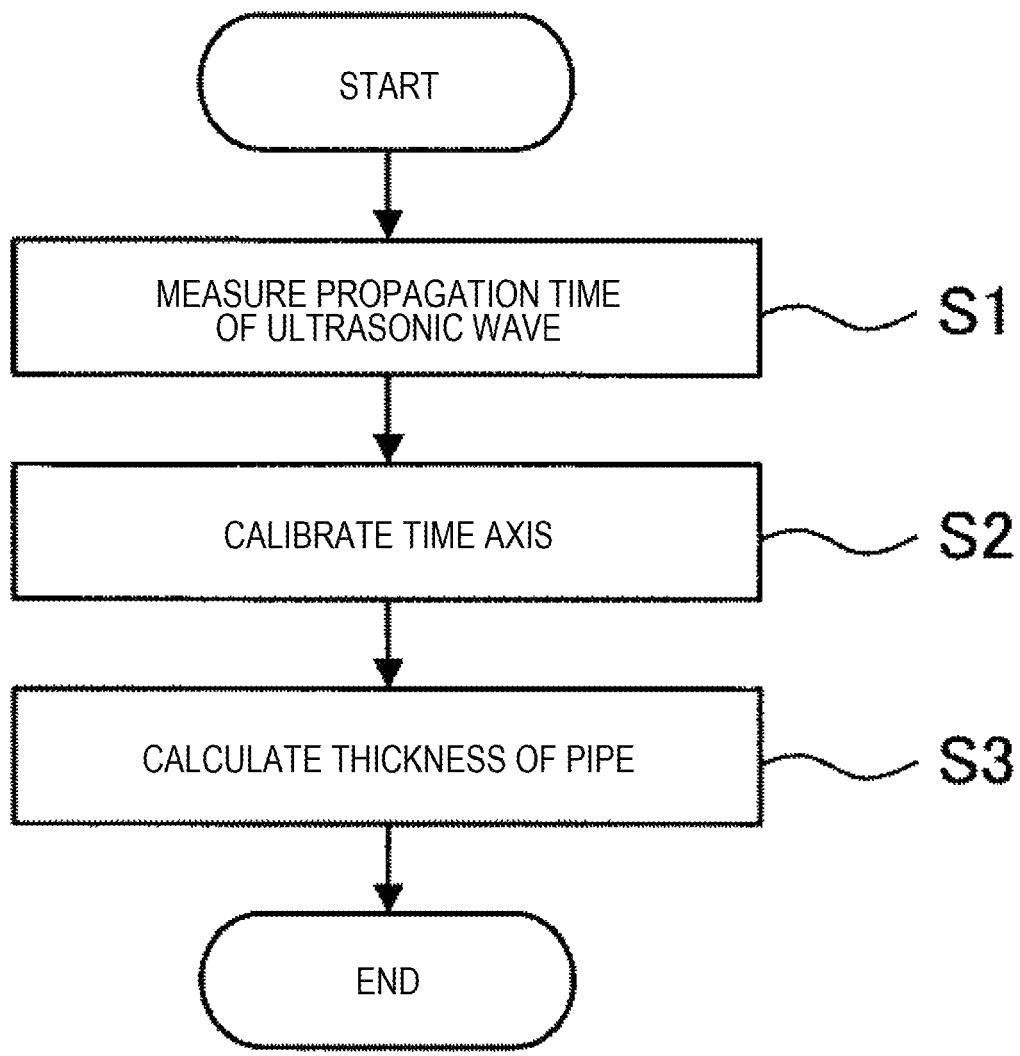
FIG. 5 is a flowchart illustrating a processing procedure of a control device in the first embodiment of the invention.

A processing content of the control device 2 of this embodiment will be described. FIG. 5 is a flowchart illustrating a processing procedure of the control device 2 in this embodiment.

In step S1, the pulsar 11 of the control device 2 outputs the drive signal to the piezoelectric element 5 of the ultrasonic sensor 1, and transmits the ultrasonic wave from the piezoelectric element 5. Thereafter, the piezoelectric element 5 receives the ultrasonic waves A and B, and converts the waves into the waveform signals and outputs to the receiver 12 of the control device 2. The signal processing unit 13 of the control device 2 performs a predetermined process on the waveform signal obtained through the receiver 12, and acquires the waveform data of the ultrasonic waves A and B. Then, for example, timing when the drive signal is output is set to a start point, and timing when the amplitude (interpolated value) of each ultrasonic wave is maximized is set to an end point. A propagation time ta of the ultrasonic wave A and a propagation time tb of the ultrasonic wave B are measured.

Thereafter, the process proceeds to step S2. The signal processing unit 13 calibrates a time axis (the start point of the propagation time) on the basis of the propagation time ta of the ultrasonic wave A, a propagation distance of the ultrasonic wave in the calibration piece 6, and a sound speed of the calibration piece 6. Specifically, for example, a propagation time ta' of the ultrasonic wave A is calculated from the propagation distance of the ultrasonic wave in the calibration piece 6 and the sound speed of the calibration piece 6. Then, it is determined whether a difference between a measurement value ta of the propagation time of the ultrasonic wave and a calculation value ta' falls within an allowable range. In a case where the difference does not fall within the allowable range, the time axis is calibrated to reduce the difference. In other words, the propagation time tb of the ultrasonic wave B measured in step S1 is corrected.

Thereafter, the process proceeds to step S3. The signal processing unit 13 calculates a thickness H of the pipe 20 from the propagation time tb of the ultrasonic wave B and a longitudinal sound speed v of the pipe 20 which are obtained as described above. The signal processing unit 13 outputs and stores the calculated thickness H of the pipe 20 to the memory unit 14, and outputs and displays the thickness to the display device 3.

An operational effect of this embodiment configured as described above will be described. The calibration piece 6 of this embodiment includes the propagation redirecting portion 8 which switches a propagation direction of the ultrasonic wave to a direction along the upper surface of the piezoelectric element 5. With this configuration, the length of the calibration piece 6 in a parallel direction to the upper surface of the piezoelectric element 5 is increased instead of the height of the calibration piece 6 in a vertical direction to the upper surface of the piezoelectric element 5. Therefore, a reception timing of the ultrasonic wave A reflected one time on the end surface 10 of the calibration piece 6 can be delayed from a reception timing of the ultrasonic wave B reflected one time on the inner surface of the pipe 20 (see FIG. 4). Therefore, both the thinning of the ultrasonic sensor 1 and the securing of measurement accuracy of the thickness of the pipe 20 can be achieved while the calibration piece 6 is assembled to the ultrasonic sensor 1.

A design method of the calibration piece 6 of this embodiment will be supplemented.

Figure 6:
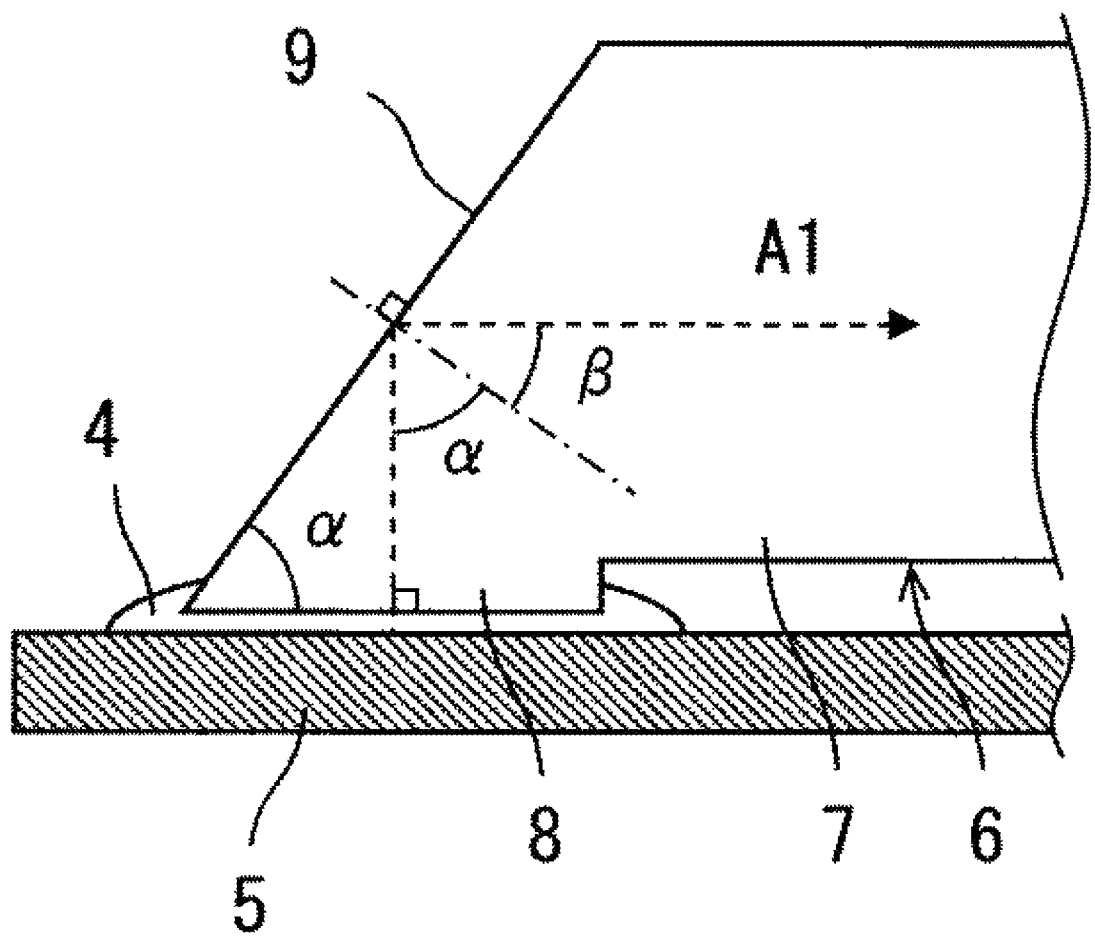
FIG. 6 is a diagram for describing a tilt angle of a slope of a propagation redirecting portion of the calibration piece in the first embodiment of the invention.

As illustrated in FIG. 6, a tilt angle α (specifically, an angle between the upper surface of the piezoelectric element 5 and the slope 9) of the slope 9 of the propagation redirecting portion 8 of the calibration piece 6 is the same as the incident angle of the ultrasonic wave from the piezoelectric element 5 onto the slope 9. The ultrasonic wave reflected on the slope 9 of the propagation redirecting portion 8 is desirably propagated in the extending direction of the propagation portion 7 (that is, the parallel direction to the upper surface of the piezoelectric element 5). Therefore, if a reflection angle of the ultrasonic wave from the piezoelectric element 5 on the slope 9 is β, α+β=90° is desirable satisfied.

For example, in a case where a longitudinal wave is used as the ultrasonic wave incident on the slope 9 from the piezoelectric element 5, and a longitudinal wave is used as the ultrasonic wave reflected on the slope 9, α=β is satisfied. Therefore, α=45° is satisfied.

On the other hand, for example, in a case where a longitudinal wave is used as the ultrasonic wave incident on the slope 9 from the piezoelectric element 5, and a transversal wave is used as the ultrasonic wave reflected and converted on the slope 9, the tilt angle α is calculated using the following Expression (1). vl in the expression represents a longitudinal sound speed of the calibration piece 6, and vs represents a transversal sound speed of the calibration piece 6.

$$\sin\alpha/\sin(90°-\alpha)=vl/vs \quad (1)$$

Since the longitudinal sound speed vl and the transversal sound speed vs are different depending on the material of the calibration piece 6, the tilt angle α is changed. In a case where the material of the calibration piece 6 is alumina, the tilt angle satisfies α=59°. In a case where the material of the calibration piece 6 is carbon steel or stainless steel, the tilt angle satisfies α=62°. In a case where the material of the calibration piece 6 is titan, the tilt angle satisfies α=63°. In a case where the material of the calibration piece 6 is aluminum, the tilt angle satisfies α=64°. In a case where the material of the calibration piece 6 is brass, the tilt angle satisfies α=65°. In a case where the material of the calibration piece 6 is lead, the tilt angle satisfies α=72°.

According to preliminary studies, even if the tilt angle α of the slope 9 of the propagation redirecting portion 8 is deviated by about ±5° with respect to an optimal value calculated using Expression (1), it can be seen that the ultrasonic wave reflected on the slope 9 is propagated in the propagation portion 7 at a sufficient SN ratio. Therefore, for example, in a case where a longitudinal wave is used as the ultrasonic wave incident on the slope 9 from the piezoelectric element 5, and a longitudinal wave is used as the ultrasonic wave reflected on the slope 9, the tilt angle may satisfy α=40°. In addition, for example, in a case where a longitudinal wave is used as the ultrasonic wave incident on the slope 9 from the piezoelectric element 5, a transversal wave is used as the ultrasonic wave reflected on the slope 9, and the material of the calibration piece 6 is lead, the tilt angle may satisfy α=77°. Therefore, the tilt angle α falls within a range of 40° to 77°.

As illustrated in FIG. 3, if a one-way propagation distance of the ultrasonic wave between the upper surface of the piezoelectric element 5 and the slope 9 of the calibration piece 6 (herein, the center position of the slope 9 in the height direction and the length direction of the calibration piece 6 is used as a representative position, which is true in the following description) is set to L1, and a one-way propagation distance of the ultrasonic wave between the slope 9 and the end surface 10 of the calibration piece 6 is set to L2, the propagation distance of the ultrasonic wave in the calibration piece 6 is represented by (L1+L2)×2. In other words, the propagation distance of the ultrasonic wave in the calibration piece 6 is represented by (Height of Propagation Redirecting Portion 8/2+ Length of Propagation Redirecting Portion 8/2+ Length of Propagation Portion 7)×2.

Assuming L1=0 because L1 is small, if the longitudinal wave is used as an ultrasonic wave propagating between the slope 9 and the end surface 10 of the calibration piece 6, the propagation time of the ultrasonic wave ta in the calibration piece 6 is represented by L2×2/vl. On the other hand, if the transversal wave is used as an ultrasonic wave propagating between the slope 9 and the end surface 10 of the calibration piece 6, the propagation time of the ultrasonic wave ta in the calibration piece 6 is represented by L2×2/vs. The propagation time of the ultrasonic wave tb in the pipe 20 is represented by H×2/v.

Therefore, if the longitudinal wave is used as an ultrasonic wave propagating between the slope 9 and the end surface 10 of the calibration piece 6, it is desirable that the condition L2>H×vl/v is satisfied in order to satisfy a relation of ta>tb. On the other hand, if the transversal wave is used as an ultrasonic wave propagating between the slope 9 and the end surface 10 of the calibration piece 6, it is desirable that the condition L2>H×vs/v is satisfied in order to satisfy a relation of ta>tb. From this viewpoint of view, it is desirable even for the length of the propagation portion 7 in the right and left direction in FIGS. 2 and 3 to satisfy the condition of becoming larger than H×vl/v or the condition of becoming larger than H×vs/v. In general, vl<vs is satisfied. Therefore, if the latter condition is satisfied, the former condition is also satisfied.

Further, in FIG. 4, in a case where the longitudinal wave is used as the ultrasonic wave propagating between the upper surface of the piezoelectric element 5 and the slope 9 of the calibration piece 6, and the transversal wave is used as the ultrasonic wave propagating between the slope 9 and the end surface 10 of the calibration piece 6, the material of the calibration piece 6 is carbon steel, and the tilt angle α is set to 62°. In addition, the material of the pipe 20 is the same as that of the calibration piece 6, the thickness H of the pipe 20 is set to 8.5 mm, and the length of the propagation portion 7 of the calibration piece 6 is set to 6.5 mm.

A second embodiment of the invention will be described using FIGS. 7 to 10. Further, in this embodiment, the same portions as those in the above embodiment will be assigned with the same symbols, and the description will be appropriately omitted.

Figure 7:
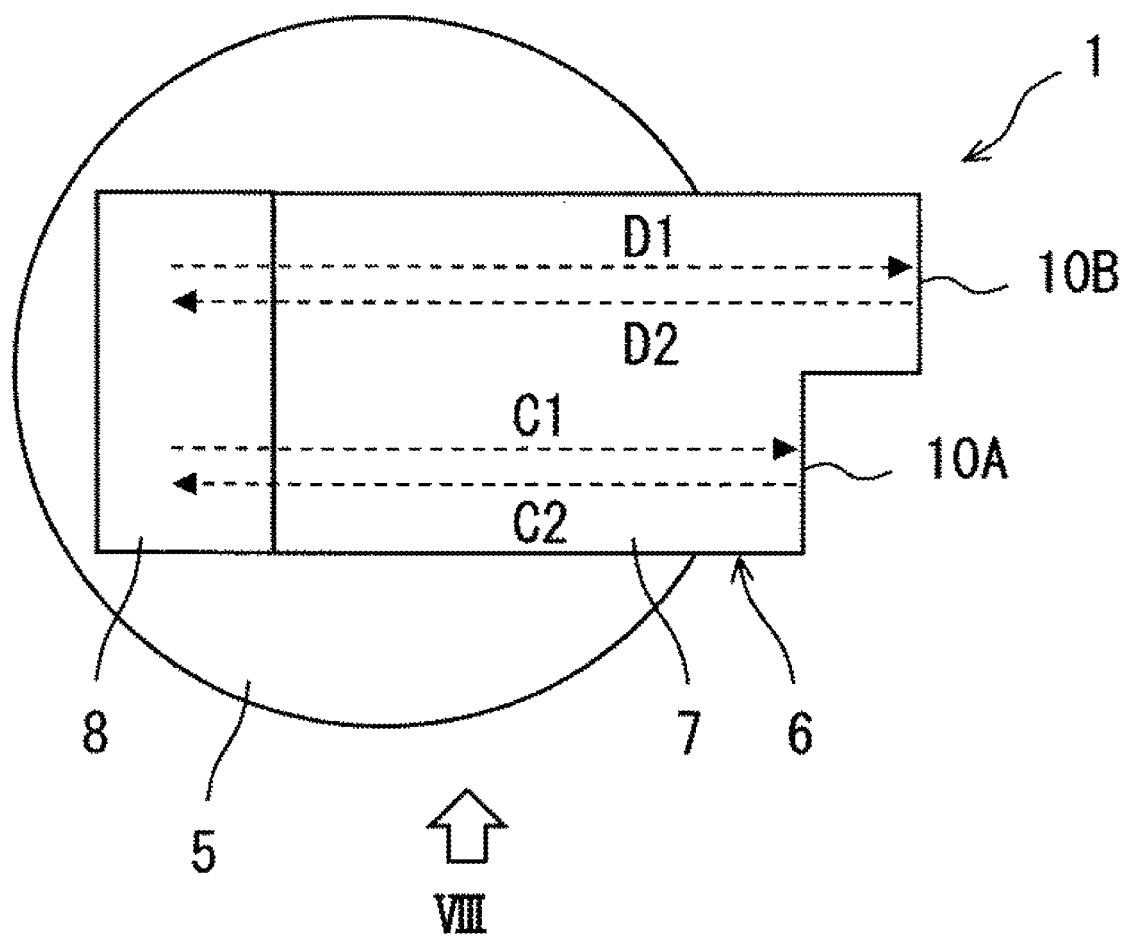
FIG. 7 is a top view illustrating a structure of the ultrasonic sensor in a second embodiment of the invention.
Figure 8:
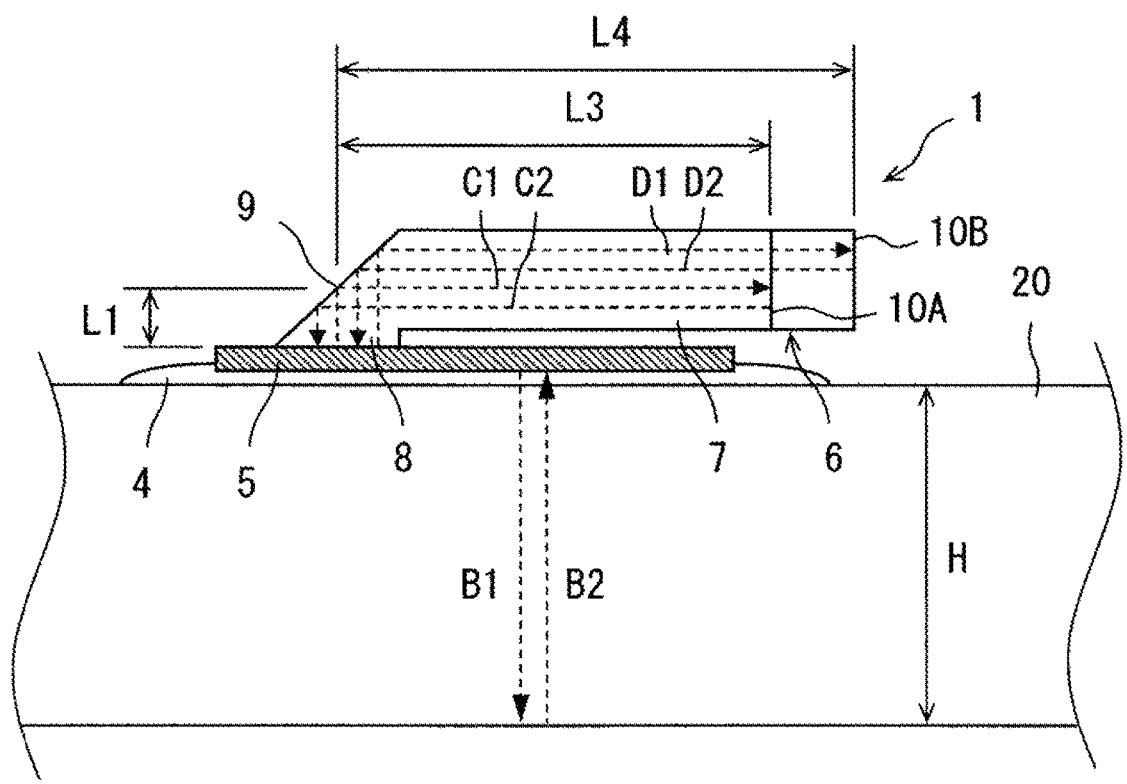
FIG. 8 is a diagram viewed from a direction of arrow VIII in FIG. 7.

FIG. 7 is a top view illustrating a structure of the ultrasonic sensor in this embodiment. FIG. 8 is a diagram viewed from a direction of arrow VIII in FIG. 7.

The propagation portion 7 of the calibration piece 6 of this embodiment includes end surfaces 10A and 10B on the other sides (the right side in FIGS. 7 and 8) in the extending direction. If a one-way propagation distance of the ultrasonic wave between the slope 9 and the end surface 10A of the calibration piece 6 is set to L3, and a one-way propagation distance of the ultrasonic wave between the slope 9 and the end surface 10B of the calibration piece 6 is set to L4, L3<L4 is satisfied.

Further, if the longitudinal wave is used as the ultrasonic wave propagating between the slope 9 and the end surfaces 10A and 10B of the calibration piece 6, the condition of L3>H×vl/v is desirable satisfied. On the other hand, if the transversal wave is used as the ultrasonic wave propagating between the slope 9 and the end surfaces 10A and 10B of the calibration piece 6, the condition of L3>H×vs/v is desirably satisfied. From this viewpoint of view, it is desirable even for the length of the propagation portion 7 from the end surface 10A to satisfy the condition of becoming larger than H×vl/v or the condition of becoming larger than H×vs/v. In general, vl<vs is satisfied. Therefore, if the latter condition is satisfied, the former condition is also satisfied.

In addition, if the longitudinal wave is used as the ultrasonic wave propagating between the slope 9 and the end surfaces 10A and 10B of the calibration piece 6, the length of the longitudinal wave of the calibration piece 6 is set to λ1, the condition of (L4−L3)>λ1 is set to be satisfied. On the other hand, if the transversal wave is used as the ultrasonic wave propagating between the slope 9 and the end surfaces 10A and 10B of the calibration piece 6, the length of the transversal wave of the calibration piece 6 is set to λs, the condition of (L4−L3)>λs is set to be satisfied.

The piezoelectric element 5 receives the ultrasonic wave B reflected one time on the inner surface of the pipe 20 as illustrated with arrows B1 and B2 in FIG. 8, the ultrasonic wave C reflected one time on the end surface 10A of the calibration piece 6 as illustrated with arrows C1 and C2 in FIGS. 7 and 8, and the ultrasonic wave D reflected one time on the end surface 10B of the calibration piece 6 as illustrated with arrows D1 and D2 in FIGS. 7 and 8. Then, the received ultrasonic waves B, C, and D are converted into the waveform signal and are output to the receiver 12 of the control device 2.

Figure 9:
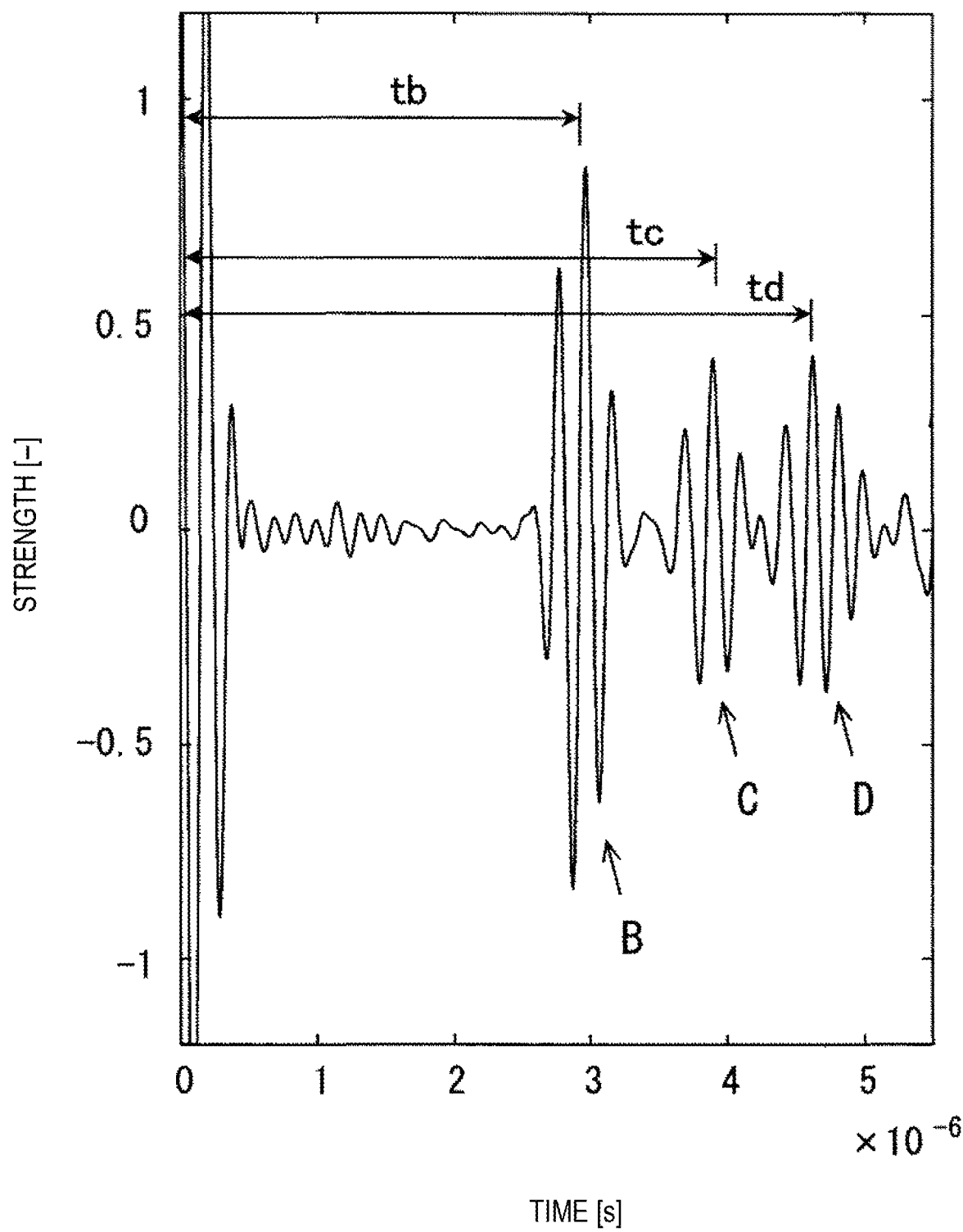
FIG. 9 is a diagram illustrating a specific example of a receiving waveform in the second embodiment of the invention.

The signal processing unit 13 of the control device 2 performs a predetermined process on the waveform signal obtained through the receiver 12. With this configuration, as illustrated in FIG. 9, the waveform data of the ultrasonic waves B, C, and D is acquired. Then, the waveform data is output and stored in the memory unit 14, and output and displayed in the display device 3.

Figure 10:
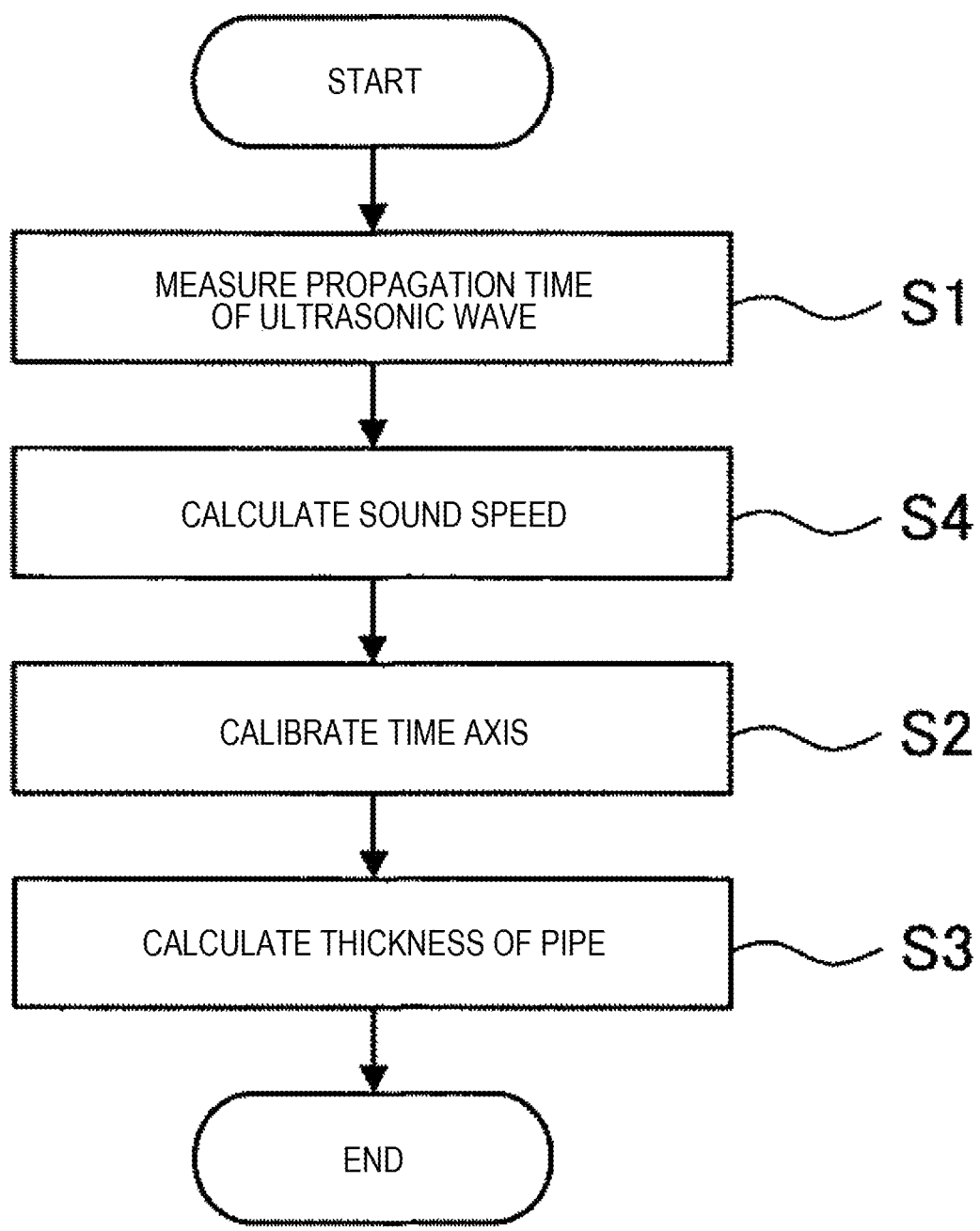
FIG. 10 is a flowchart illustrating a processing procedure of a control device in the second embodiment of the invention.

A processing content of the control device 2 of this embodiment will be described. FIG. 10 is a flowchart illustrating a processing procedure of the control device 2 in this embodiment.

In step S1, the pulsar 11 of the control device 2 outputs the drive signal to the piezoelectric element 5 of the ultrasonic sensor 1, and transmits the ultrasonic wave from the piezoelectric element 5. Thereafter, the piezoelectric element 5 receives the ultrasonic waves B, C and D, and converts the waves into the waveform signals and outputs to the receiver 12 of the control device 2. The signal processing unit 13 of the control device 2 performs a predetermined process on the waveform signal obtained through the receiver 12, and acquires the waveform data of the ultrasonic waves B, C, and D. Then, for example, timing when the drive signal is output is set to a start point, and timing when the amplitude (interpolated value) of each ultrasonic wave is maximized is set to an end point. The propagation time tb of the ultrasonic wave B, a propagation time tc of the ultrasonic wave C, and a propagation time td of the ultrasonic wave D are measured.

Thereafter, the process proceeds to step S4. The signal processing unit 13 calculates the sound speed of the calibration piece 6 from the propagation time tc and the propagation distance of the ultrasonic wave C reflected on the end surface 10A of the calibration piece 6. Specifically, for example, if a distance expressed by (L1+L3)×2 is used as the propagation distance of the ultrasonic wave C reflected on the end surface 10A of the calibration piece 6, the longitudinal wave is used as the ultrasonic wave propagating between the upper surface of the piezoelectric element 5 and the slope 9 of the calibration piece 6, and the longitudinal wave is used as the ultrasonic wave propagating between the slope 9 and the end surface 10A of the calibration piece 6, the longitudinal sound speed vl of the calibration piece 6 is calculated from the propagation time tc and the propagation distance of the ultrasonic wave C.

Alternatively, for example, assuming L1=0, if a distance expressed by L3×2 is used as the propagation distance of the ultrasonic wave C reflected on the end surface 10A of the calibration piece 6, and the longitudinal wave is used as the ultrasonic wave propagating between the slope 9 and the end surface 10 of the calibration piece 6, the longitudinal sound speed vl of the calibration piece 6 is calculated from the propagation time tc and the propagation distance of the ultrasonic wave C. In addition, for example, assuming L1=0, if a distance expressed by L3×2 is used as the propagation distance of the ultrasonic wave C reflected on the end surface 10A of the calibration piece 6, and the transversal wave is used as the ultrasonic wave propagating between the slope 9 and the end surface 10 of the calibration piece 6, the transversal sound speed vs of the calibration piece 6 is calculated from the propagation time tc and the propagation distance of the ultrasonic wave C.

The signal processing unit 13 corrects the longitudinal sound speed v of the pipe 20 on the basis of the calculated sound speed of the calibration piece 6 (specifically, the longitudinal sound speed vl or the transversal sound speed vs). Making an explanation in detail, in a case where the material of the calibration piece 6 is the same as the material of the pipe 20, the temperature of the calibration piece 6 and the temperature of the pipe 20 are considered as the same. Therefore, the longitudinal sound speed v of the pipe 20 is the same as the calculated longitudinal sound speed vl of the calibration piece 6. Alternatively, if a longitudinal sound speed vl is calculated from the calculated transversal sound speed vs of the calibration piece 6 using a relational expression between the transversal sound speed vs and the longitudinal sound speed vl of the calibration piece 6 which are created in advance, the longitudinal sound speed v of the pipe 20 is the same as the calculated longitudinal sound speed vl of the calibration piece 6.

In a case where the material of the calibration piece is different from the material of the pipe 20, the temperature of the calibration piece 6 is calculated from the calculated sound speed of the calibration piece 6 using a relational expression between the sound speed of the calibration piece 6 and the temperature of the calibration piece 6 which are created in advance, and the temperature of the calibration piece 6 and the temperature of the pipe 20 are considered as the same. Then, the longitudinal sound speed v of the pipe 20 is calculated from the calculated temperature of the pipe 20 using the relational expression between the temperature of the pipe 20 and the longitudinal sound speed v of the pipe 20 which are created in advance.

Thereafter, the process proceeds to step S2. The signal processing unit 13 calibrates the time axis (specifically, the start point of the propagation time) on the basis of the propagation time td and the propagation distance of the ultrasonic wave D reflected on the end surface 10B of the calibration piece 6 and the sound speed of the calibration piece 6. Specifically, for example, a propagation time td' of the ultrasonic wave D is calculated from the propagation distance of the ultrasonic wave D reflected on the end surface 10B of the calibration piece 6 (specifically, for example, a distance expressed by (L1+L4)×2 or a distance expressed by L4×2) and the sound speed of the calibration piece 6. Then, it is determined whether a difference between a measurement value td of the propagation time of the ultrasonic wave and a calculation value td' falls within an allowable range. In a case where the difference does not fall within the allowable range, the time axis is calibrated to reduce the difference. In other words, the propagation time tb of the ultrasonic wave B acquired in step S1 is corrected.

Thereafter, the process proceeds to step S3. The signal processing unit 13 calculates a thickness H of the pipe 20 from the propagation time tb of the ultrasonic wave B and a longitudinal sound speed v of the pipe 20 which are obtained as described above. The signal processing unit 13 outputs and stores the calculated thickness H of the pipe 20 to the memory unit 14, and outputs and displays the thickness to the display device 3.

An operational effect of this embodiment configured as described above will be described. Similarly to the first embodiment, the calibration piece 6 of this embodiment also includes the propagation redirecting portion 8 which switches a propagation direction of the ultrasonic wave to a direction along the upper surface of the piezoelectric element 5. With this configuration, the length of the calibration piece 6 in a parallel direction to the upper surface of the piezoelectric element 5 is increased instead of the height of the calibration piece 6 in a vertical direction to the upper surface of the piezoelectric element 5. Therefore, a reception timing of the ultrasonic wave C reflected one time on the end surface 10A of the calibration piece 6 and a reception timing of the ultrasonic wave D reflected one time on the end surface 10B of the calibration piece 6 can be delayed from a reception timing of the ultrasonic wave B reflected one time on the inner surface of the pipe 20 (see FIG. 9). Therefore, both the thinning of the ultrasonic sensor 1 and the securing of measurement accuracy of the thickness of the pipe 20 can be achieved while the calibration piece 6 is assembled to the ultrasonic sensor 1.

In addition, in this embodiment, it is possible to correct the sound speeds of the calibration piece 6 and the pipe 20 without using a temperature sensor which detects the calibration piece 6 and the temperature of the pipe 20. Therefore, the thickness of the pipe 20 can be measured with a high measurement accuracy with a simple configuration.

A third embodiment of the invention will be described using FIGS. 11 to 13. Further, in this embodiment, the same portions as those in the above embodiment will be assigned with the same symbols, and the description will be appropriately omitted.

Figure 11:
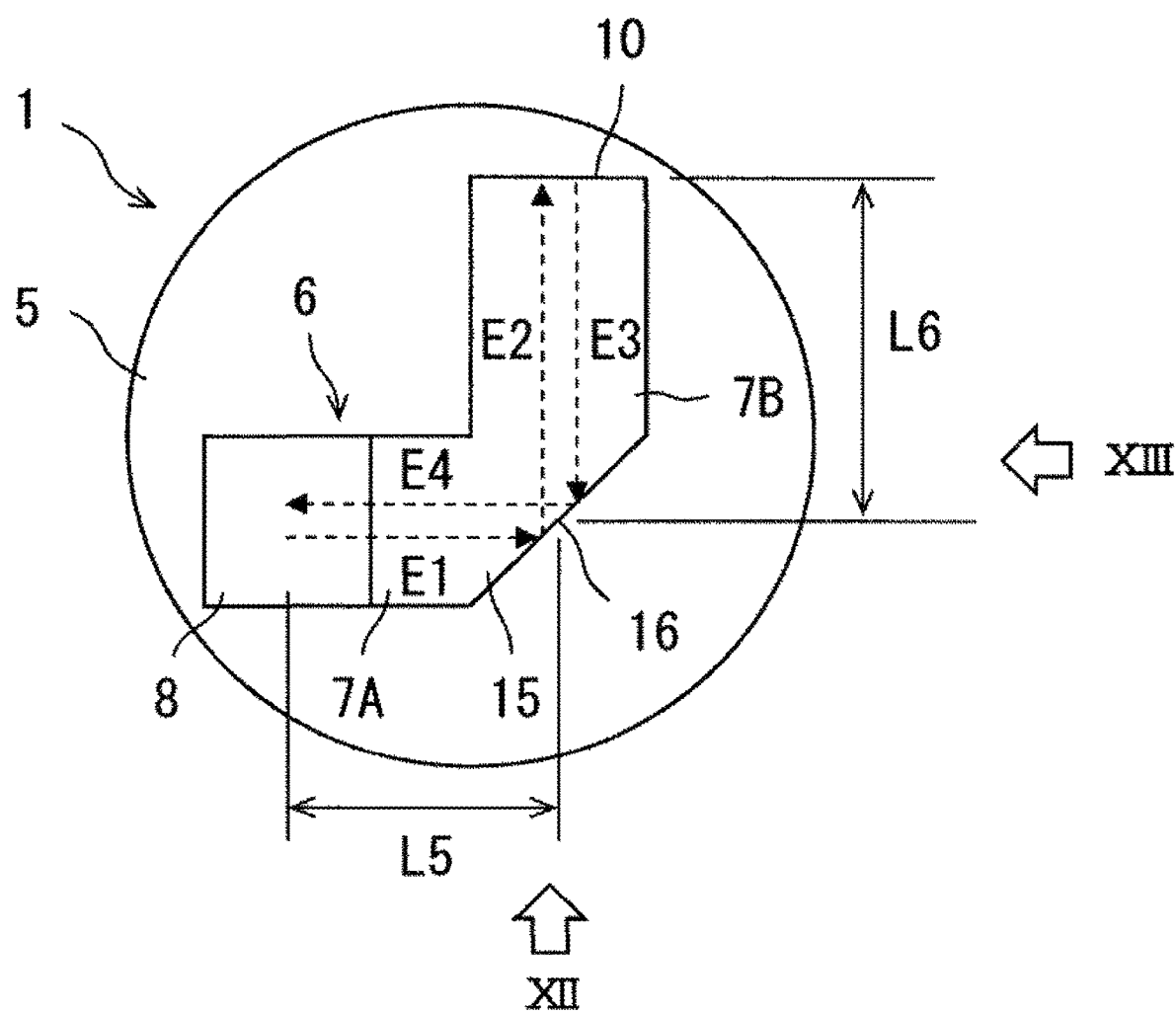
FIG. 11 is a top view illustrating a structure of the ultrasonic sensor in a third embodiment of the invention.

FIG. 11 is a top view illustrating a structure of the ultrasonic sensor in this embodiment. FIG. 12 is a diagram viewed from a direction of arrow XII in FIG. 11. FIG. 13 is a diagram viewed from a direction of arrow XIII in FIG. 11.

The calibration piece 6 of this embodiment includes the propagation portion 7A of the square column shape extending in one direction (the right and left direction in FIGS. 11 and 12) along the upper surface of the piezoelectric element 5, the propagation portion 7B of the square column shape extending in the other direction (the up and down direction in FIG. 11, and the right and left direction in FIG. 13) along the upper surface of the piezoelectric element 5, a propagation direction changing unit 15 of the triangular column shape disposed between the propagation portions 7A and 7B, and the propagation redirecting portion 8 of the triangular column shape which is formed in one side (the left side in FIGS. 11 and 12) in the extending direction of the propagation portion 7A and connected to the piezoelectric element 5 through the heat resistant adhesive 4.

The propagation redirecting portion 8 includes the slope 9 which is inclined in the vertical direction to the upper surface of the piezoelectric element 5. The propagation direction changing unit 15 includes a slope 16 which is inclined in the parallel direction to the upper surface of the piezoelectric element 5. Then, as illustrated with arrows E1 and E2 in FIGS. 11 and 12, the ultrasonic wave incident on the propagation redirecting portion 8 from the piezoelectric element 5 is reflected on the slope 9 and emitted toward the propagation portion 7A. The ultrasonic wave incident on the propagation direction changing unit 15 from the propagation portion 7A is reflected on the slope 16 and emitted toward the propagation portion 7B. In addition, as illustrated with arrows E3 and E4 in FIGS. 11 and 13, the ultrasonic wave which is reflected on the end surface 10 on the other side (the upper side in FIG. 11, and the right side in FIG. 13) in the extending direction of the propagation portion 7B and incident on the propagation direction changing unit 15 from the propagation portion 7B is reflected on the slope 16 and emitted toward the propagation portion 7A. The ultrasonic wave incident on the propagation redirecting portion 8 from the propagation portion 7A is reflected on the slope 9 and emitted toward the piezoelectric element 5.

If the longitudinal wave is used as the ultrasonic wave propagating between the slope 9 and the slope 16 and between the slope 16 and the end surface 10 of the calibration piece 6, and a one-way propagation distance of the ultrasonic wave between the slope 9 and the slope 16 of the calibration piece 6 (herein, the center position of the slope 16 in a width direction and a length direction of the calibration piece 6 is used as a representative position, which is true in the following description) is set to L5, and a one-way propagation distance of the ultrasonic wave between the slope 16 and the end surface 10 of the calibration piece 6 is set to L6, the condition of $(L5+L6) > H \times vl/v$ is desirably satisfied. On the other hand, if the transversal wave is used as the ultrasonic wave propagating between the slope 9 and the slope 16 and between the slope 16 and the end surface 10 of the calibration piece 6, the condition of $(L5+L6) > H \times vs/v$ is desirably satisfied.

Figure 12:
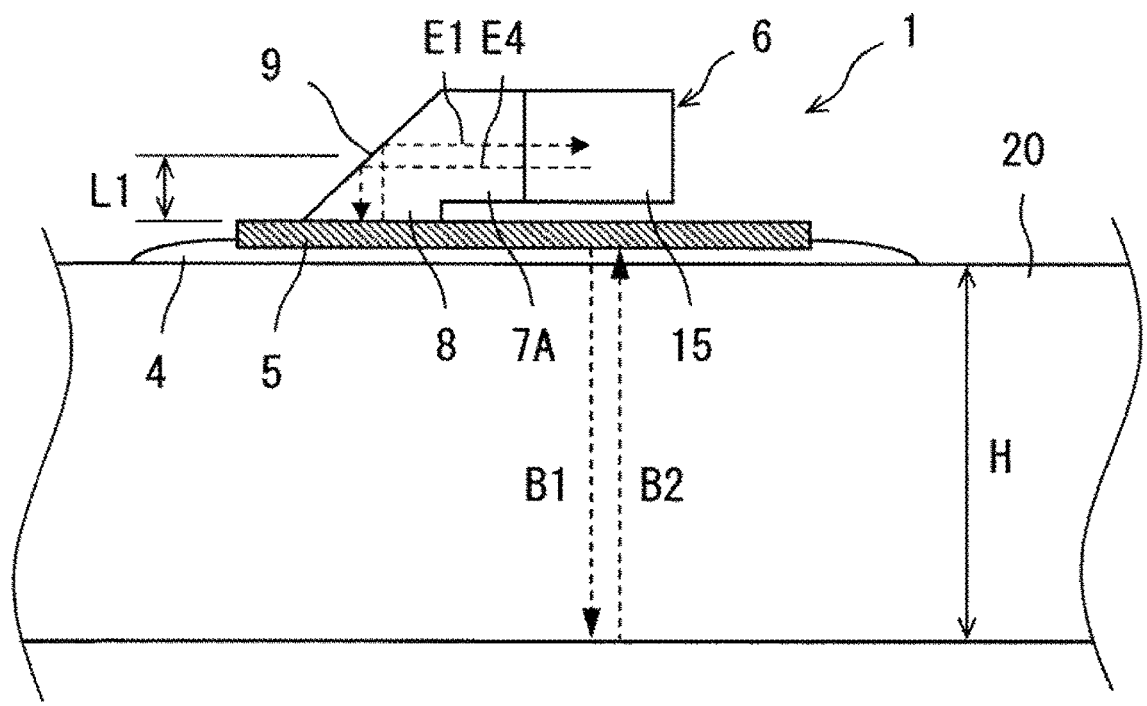
FIG. 12 is a diagram viewed from a direction of arrow XII in FIG. 11.
Figure 13:
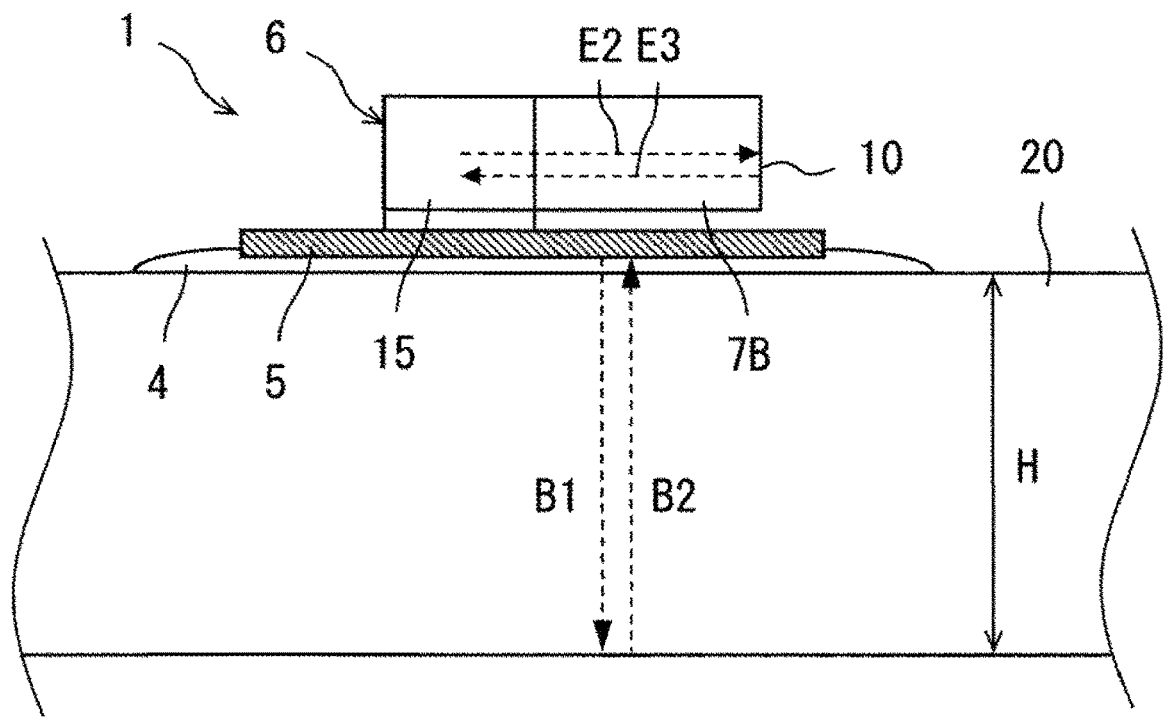
FIG. 13 is a diagram viewed from a direction of arrow XIII in FIG. 11.

The piezoelectric element 5 receives the ultrasonic wave B reflected one time on the inner surface of the pipe 20 as illustrated with arrows B1 and B2 in FIGS. 12 and 13, and the ultrasonic wave E reflected one time on the end surface 10 of the calibration piece 6 as illustrated with arrows E1 to E4 in FIGS. 11 to 13. Then, the received ultrasonic waves B and E are converted into the waveform signal and are output to the receiver 12 of the control device 2.

Similarly to the first embodiment, the control device 2 calibrates the propagation time of the ultrasonic wave E propagating in the calibration piece 6 and the time axis on the basis of the sound speed of the calibration piece 6, and calculates the thickness H of the pipe 20 on the basis of the propagation time of the ultrasonic wave B propagating in the pipe 20 and the longitudinal sound speed v of the pipe 20. Then, the calculated thickness H of the pipe 20 is output and stored in the memory unit 14, and output and displayed in the display device 3.

An operational effect of this embodiment configured as described above will be described. Similarly to the first embodiment, the calibration piece 6 of this embodiment also includes the propagation redirecting portion 8 which switches a propagation direction of the ultrasonic wave to a direction along the upper surface of the piezoelectric element 5. With this configuration, the length of the calibration piece 6 in a parallel direction to the upper surface of the piezoelectric element 5 is increased instead of the height of the calibration piece 6 in a vertical direction to the upper surface of the piezoelectric element 5. Therefore, a reception timing of the ultrasonic wave E reflected one time on the end surface 10 of the calibration piece 6 can be delayed from a reception timing of the ultrasonic wave B reflected one time on the inner surface of the pipe 20. Therefore, both the thinning of the ultrasonic sensor 1 and the securing of measurement accuracy of the thickness of the pipe 20 can be achieved while the calibration piece 6 is assembled to the ultrasonic sensor 1. In addition, the ultrasonic sensor 1 in this embodiment can be minimized compared to the first embodiment.

Further, in the third embodiment, the propagation portion 7B of the calibration piece 6 has been described as an example in case where one end surface 10 is included similarly to the first embodiment, but the invention is not limited thereto. Similarly to the second embodiment, two end surfaces 10A and 10B may be included. Then, the control device 2 may perform the similar process as the second embodiment.

A fourth embodiment of the invention will be described using FIGS. 14 and 15. Further, in this embodiment, the same portions as those in the above embodiment will be assigned with the same symbols, and the description will be appropriately omitted.

Figure 14:
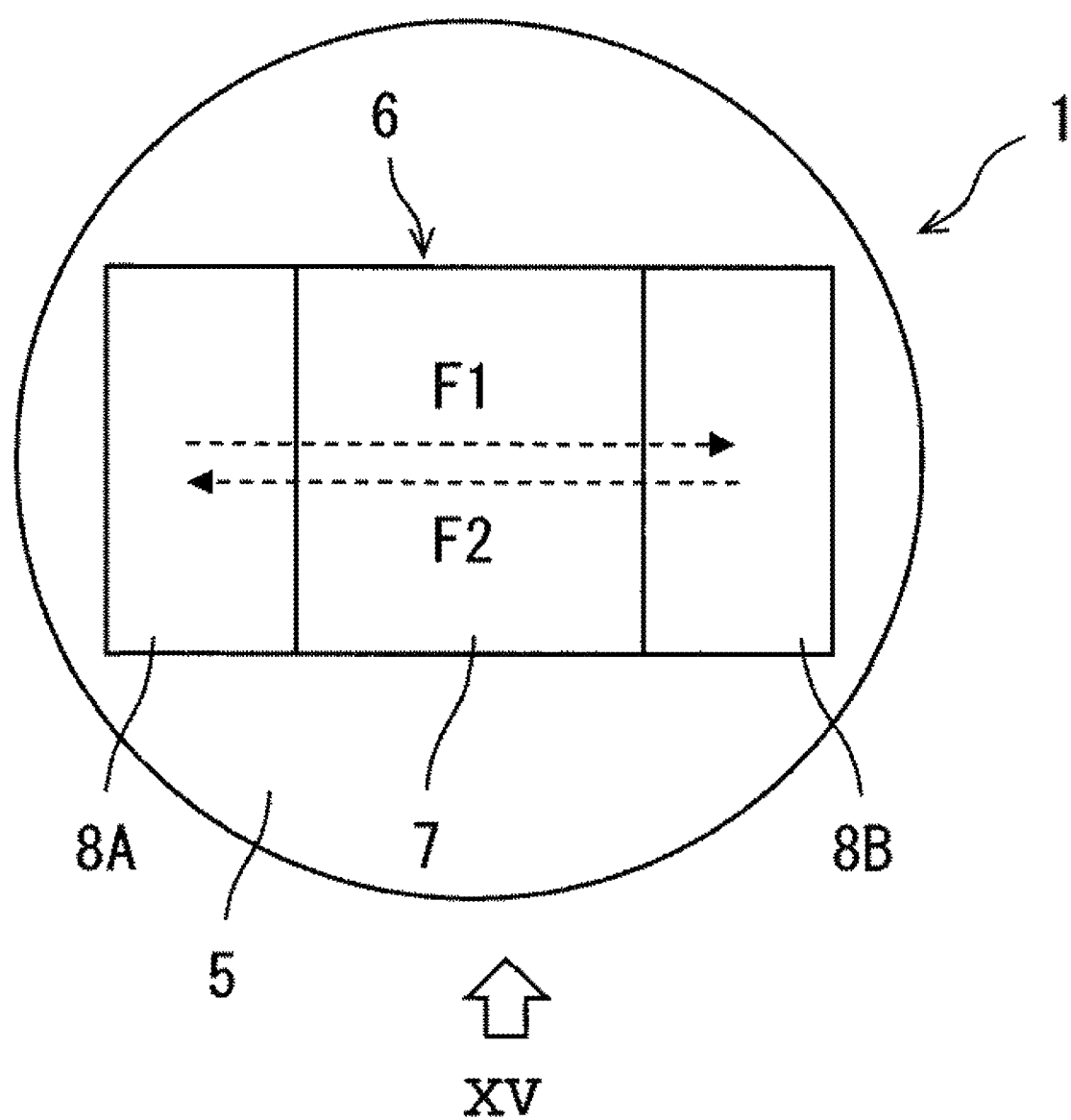
FIG. 14 is a top view illustrating a structure of the ultrasonic sensor in a fourth embodiment of the invention.

FIG. 14 is a top view illustrating a structure of the ultrasonic sensor in this embodiment. FIG. 15 is a diagram viewed from a direction of arrow XV in FIG. 14.

The calibration piece 6 of this embodiment includes the propagation portion 7 of the square column shape extending in one direction (the right and left direction in FIGS. 14 and 15) along the upper surface of the piezoelectric element 5, a propagation redirecting portion 8A of the triangular column shape which is formed on one side (the left side in FIGS. 14 and 15) of the extending direction of the propagation portion 7 and connected to the piezoelectric element 5 through the heat resistant adhesive 4, and a propagation redirecting portion 8B of the triangular column shape which is formed on the other side (the right side in FIGS. 14 and 15) of the extending direction of the propagation portion 7 and connected to the piezoelectric element 5 through the heat resistant adhesive 4.

The propagation redirecting portions 8A and 8B include respectively slopes 9A and 9B inclined in the vertical direction to the upper surface of the piezoelectric element 5. Then, as illustrated with arrow F1 in FIGS. 14 and 15, the ultrasonic wave incident on the propagation redirecting portion 8A from the piezoelectric element 5 is reflected on the slope 9A and emitted toward the propagation portion 7. The ultrasonic wave incident on the propagation redirecting portion 8B from the propagation portion 7 is reflected on the slope 9B and emitted toward the piezoelectric element 5. In addition, as illustrated with arrow F2 in FIGS. 14 and 15, the ultrasonic wave incident on the propagation redirecting portion 8B from the piezoelectric element 5 is reflected on the slope 9B and emitted toward the propagation portion 7. The ultrasonic wave incident on the propagation redirecting portion 8A from the propagation portion 7 is reflected on the slope 9A and emitted toward the piezoelectric element 5.

If the longitudinal wave is used as the ultrasonic wave propagating between the slope 9A and the slope 9B of the calibration piece 6, and a one-way propagation distance of the ultrasonic wave between the upper surface of the piezoelectric element 5 and the slope 9A or 9B of the calibration piece 6 is set to L1, and a one-way propagation distance of the ultrasonic wave between the slope 9A and the slope 9B of the calibration piece 6 is set to L7, the condition of $L7 > H \times 2 \times vl/v$ is desirably satisfied. On the other hand, if the transversal wave is used as the ultrasonic wave propagating between the slope 9A and the slope 9B of the calibration piece 6, the condition of $L7 > H \times 2 \times vs/v$ is desirably satisfied.

Figure 15:
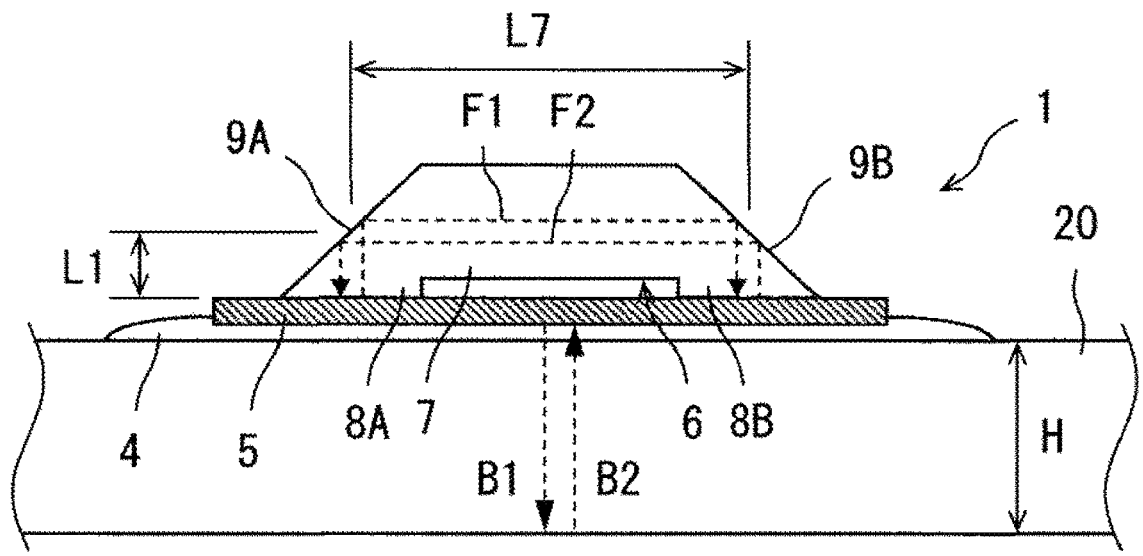
FIG. 15 is a diagram viewed from a direction of arrow XV in FIG. 14.

The piezoelectric element 5 receives the ultrasonic wave B reflected one time on the inner surface of the pipe 20 as illustrated with arrows B1 and B2 in FIG. 15, and the ultrasonic wave F propagating in the calibration piece 6 as illustrated with arrows F1 and F2 in FIGS. 14 and 15. Then, the received ultrasonic waves B and F are converted into the waveform signal and are output to the receiver 12 of the control device 2.

Similarly to the first embodiment, the control device 2 calibrates the propagation time of the ultrasonic wave F propagating in the calibration piece 6 and the time axis on the basis of the sound speed of the calibration piece 6, and calculates the thickness H of the pipe 20 on the basis of the propagation time of the ultrasonic wave B propagating in the pipe 20 and the longitudinal sound speed v of the pipe 20. Then, the calculated thickness H of the pipe 20 is output and stored in the memory unit 14, and output and displayed in the display device 3.

An operational effect of this embodiment configured as described above will be described. The calibration piece 6 of this embodiment includes the propagation redirecting portions 8A and 8B which switches a propagation direction of the ultrasonic wave to a direction along the upper surface of the piezoelectric element 5. With this configuration, the length of the calibration piece 6 in a parallel direction to the upper surface of the piezoelectric element 5 is increased instead of the height of the calibration piece 6 in a vertical direction to the upper surface of the piezoelectric element 5. Therefore, a reception timing of the ultrasonic wave F propagating in the calibration piece 6 can be delayed from a reception timing of the ultrasonic wave B reflected one time on the inner surface of the pipe 20. Therefore, both the thinning of the ultrasonic sensor 1 and the securing of measurement accuracy of the thickness of the pipe 20 can be achieved while the calibration piece 6 is assembled to the ultrasonic sensor 1.

A fifth embodiment of the invention will be described using FIGS. 16 to 18. Further, in this embodiment, the same portions as those in the above embodiment will be assigned with the same symbols, and the description will be appropriately omitted.

Figure 16:
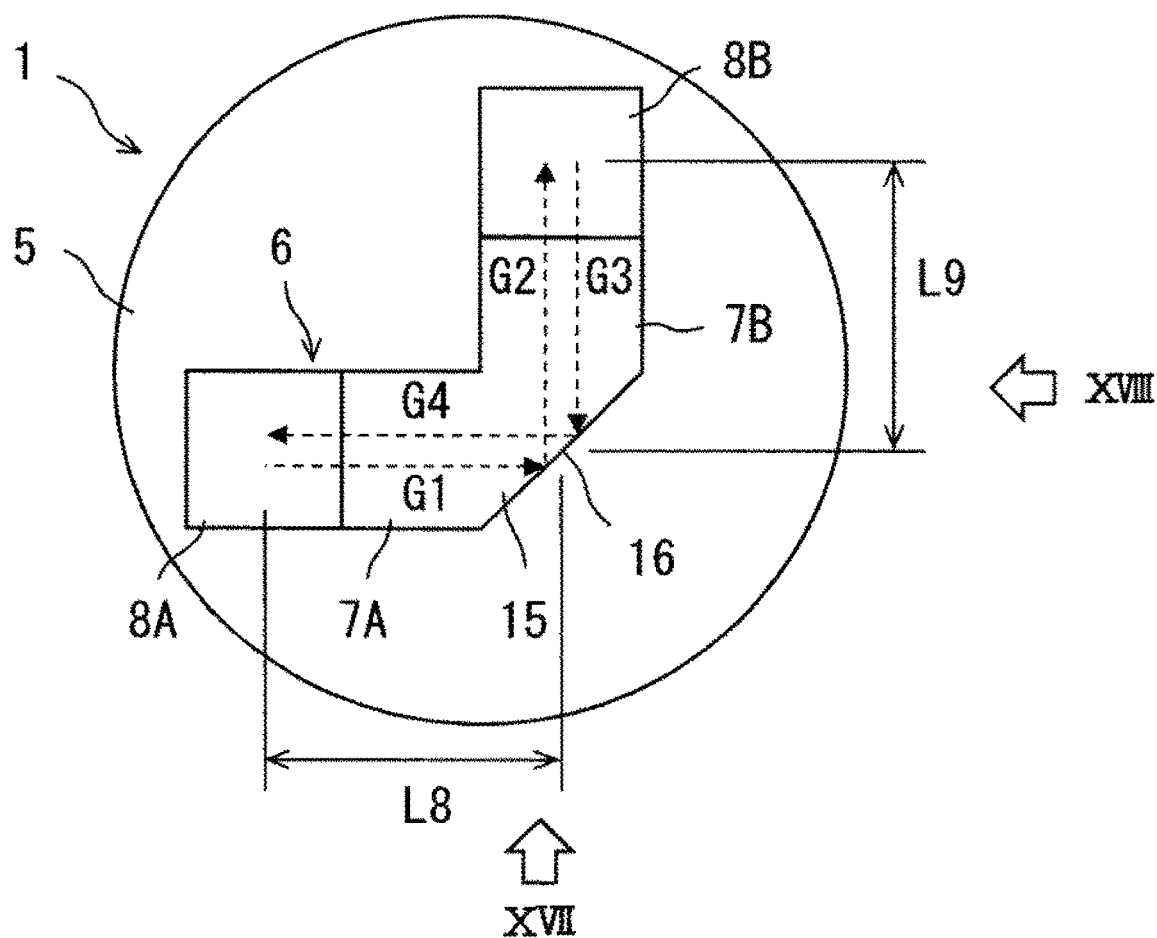
FIG. 16 is a top view illustrating a structure of the ultrasonic sensor in a fifth embodiment of the invention.

FIG. 16 is a top view illustrating a structure of the ultrasonic sensor in this embodiment. FIG. 17 is a diagram viewed from a direction of arrow XVII in FIG. 16. FIG. 18 is a diagram viewed from a direction of arrow XVIII in FIG. 16.

The calibration piece 6 of this embodiment includes the propagation portion 7A of the square column shape extending in one direction (the right and left direction in FIGS. 16 and 17) along the upper surface of the piezoelectric element 5, the propagation portion 7B of the square column shape extending in the other direction (the up and down direction in FIG. 16, and the right and left direction in FIG. 18) along the upper surface of the piezoelectric element 5, a propagation direction changing unit 15 of the triangular column shape disposed between the propagation portions 7A and 7B, the propagation redirecting portion 8A of the triangular column shape which is formed in one side (the left side in FIGS. 16 and 17) in the extending direction of the propagation portion 7A and connected to the piezoelectric element 5 through the heat resistant adhesive 4, and the propagation redirecting portion 8B of the triangular column shape which is formed on the other side (the upper side in FIG. 16, and the right side in FIG. 18) of the propagation portion 7B and connected to the piezoelectric element 5 through the heat resistant adhesive 4.

The propagation redirecting portions 8A and 8B include respectively the slopes 9A and 9B which are inclined in the vertical direction to the upper surface of the piezoelectric element 5. The propagation direction changing unit 15 includes a slope 16 which is inclined in the parallel direction to the upper surface of the piezoelectric element 5. Then, as illustrated with arrows G1 and G2 in FIGS. 16 to 18, the ultrasonic wave incident on the propagation redirecting portion 8A from the piezoelectric element 5 is incident on the slope 9A and emitted toward the propagation portion 7A, the ultrasonic wave incident on the propagation direction changing unit 15 from the propagation portion 7A is incident on the slope 16 and emitted toward the propagation portion 7B, and the ultrasonic wave incident on the propagation redirecting portion 8B from the propagation portion 7B is incident on the slope 9B and emitted toward the piezoelectric element 5. In addition, as illustrated with arrows G3 and G4 in FIGS. 11 to 13, the ultrasonic wave incident on the propagation redirecting portion 8B from the piezoelectric element 5 is incident on the slope 9B and emitted toward the propagation portion 7B, the ultrasonic wave incident on the propagation direction changing unit 15 from the propagation portion 7B is incident on the slope 16 and emitted toward the propagation portion 7A, and the ultrasonic wave incident on the propagation redirecting portion 8A from the propagation portion 7A is incident on the slope 9A and emitted toward the piezoelectric element 5.

If the longitudinal wave is used as the ultrasonic wave propagating between the slope 9A and the slope 16 and between the slope 16 and the slope 9B of the calibration piece 6, a one-way propagation distance of the ultrasonic wave between the upper surface of the piezoelectric element 5 and the slope 9A or 9B of the calibration piece 6 is set to L1, a one-way propagation distance of the ultrasonic wave between the slope 9A and the slope 16 of the calibration piece 6 is set to L8, and a one-way propagation distance of the ultrasonic wave between the slope 16 and the slope 9B of the calibration piece 6 is set to L9, the condition of $(L8+L9)>H\times2\times vl/v$ is desirably satisfied. On the other hand, if the transversal wave is used as the ultrasonic wave propagating between the slope 9A and the slope 16 and between the slope 16 and the slope 9B of the calibration piece 6, the condition of $(L8+L9)>H\times2\times vs/v$ is desirably satisfied.

Figure 17:
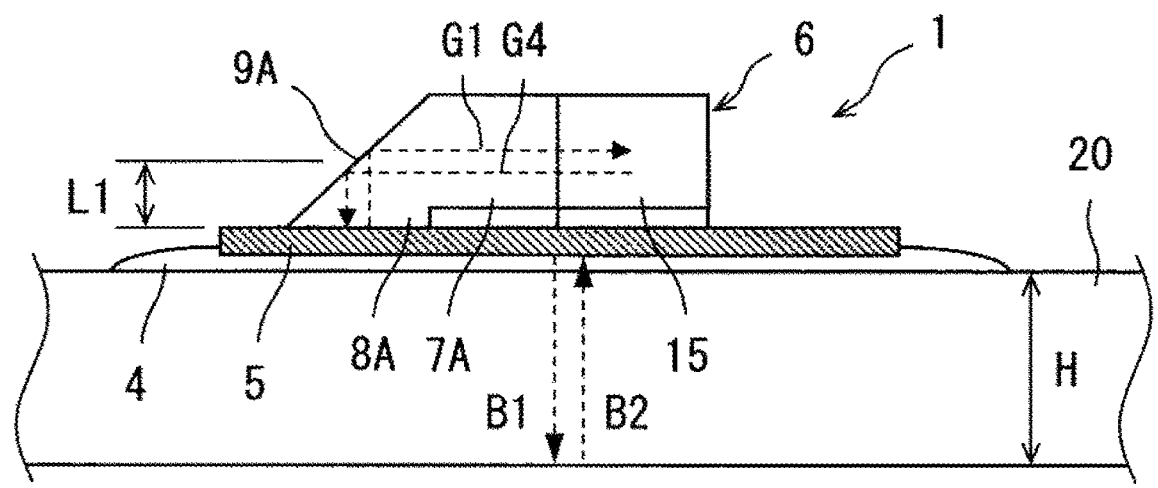
FIG. 17 is a diagram viewed from a direction of arrow XVII in FIG. 16.
Figure 18:
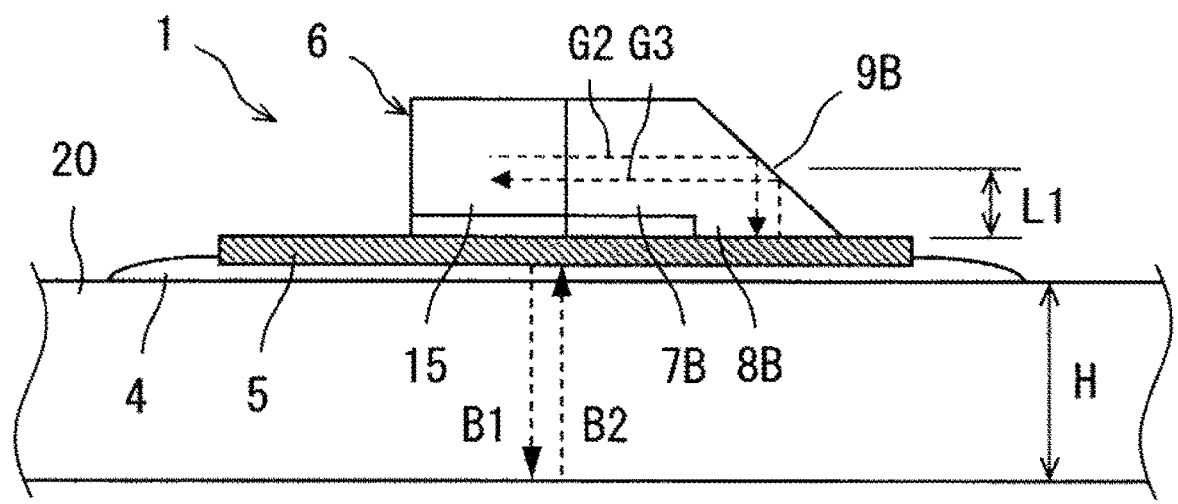
FIG. 18 is a diagram viewed from a direction of arrow XVIII in FIG. 16.

The piezoelectric element 5 receives the ultrasonic wave B reflected one time on the inner surface of the pipe 20 as illustrated with arrows B1 and B2 in FIGS. 17 and 18, and the ultrasonic wave G propagating in the calibration piece 6 as illustrated with arrows G1 to G4 in FIGS. 16 to 18. Then, the received ultrasonic waves B and G are converted into the waveform signal and are output to the receiver 12 of the control device 2.

Similarly to the first embodiment, the control device 2 calibrates the propagation time of the ultrasonic wave G propagating in the calibration piece 6 and the time axis on the basis of the sound speed of the calibration piece 6, and calculates the thickness H of the pipe 20 on the basis of the propagation time of the ultrasonic wave B propagating in the pipe 20 and the longitudinal sound speed v of the pipe 20. Then, the calculated thickness H of the pipe 20 is output and stored in the memory unit 14, and output and displayed in the display device 3.

An operational effect of this embodiment configured as described above will be described. Similarly to the fourth embodiment, the calibration piece 6 of this embodiment also includes the propagation redirecting portions 8A and 8B which switch a propagation direction of the ultrasonic wave to a direction along the upper surface of the piezoelectric element 5. With this configuration, the length of the calibration piece 6 in a parallel direction to the upper surface of the piezoelectric element 5 is increased instead of the height of the calibration piece 6 in a vertical direction to the upper surface of the piezoelectric element 5. Therefore, a reception timing of the ultrasonic wave G propagating in the calibration piece 6 can be delayed from a reception timing of the ultrasonic wave B reflected one time on the inner surface of the pipe 20. Therefore, both the thinning of the ultrasonic sensor 1 and the securing of measurement accuracy of the thickness of the pipe 20 can be achieved while the calibration piece 6 is assembled to the ultrasonic sensor 1.

Further, in the third and fifth embodiments, the calibration piece 6 have been described about an example in a case where there are provided two propagation portions 7A and 7B and one propagation direction changing unit 15 between the propagation portions 7A and 7B, but the invention is not limited thereto. In other words, the calibration piece 6 may include three or more propagation portions and two or more propagation direction changing units between the propagation portions.

What is claimed is:

1. An ultrasonic inspection system, comprising:
an ultrasonic sensor which includes a piezoelectric element to transmit and receive an ultrasonic wave and a calibration piece; and
a control device which calibrates a time axis, including a propagation start time, on the basis of a propagation time of the ultrasonic wave propagating in the calibration piece and a sound speed of the calibration piece, and calculates a thickness of a subject on the basis of a propagation time of the ultrasonic wave propagating in the subject, based on the propagation start time, and a sound speed of the subject,
wherein the calibration piece includes
a propagation portion which extends along a surface of the piezoelectric element on a side opposite to the subject, and
a propagation redirecting portion which is formed on one side in an extending direction of the propagation portion, and is connected to the surface of the piezoelectric element through a contact medium, and
wherein the propagation redirecting portion includes a slope inclined in a vertical direction to the surface of the piezoelectric element, reflects the ultrasonic wave incident on the propagation redirecting portion from the piezoelectric element on the slope and emits to the propagation portion, reflects the ultrasonic wave on the slope which is reflected on an end surface on another side in the extending direction of the propagation portion and incident on the propagation redirecting portion from the propagation portion and emits to the piezoelectric element.

2. The ultrasonic inspection system according to claim 1, wherein the propagation portion of the calibration piece has a first end surface and a second end surface which are different in a propagation distance of an ultrasonic wave from the slope of the propagation redirecting portion,
wherein the control device
calculates the sound speed of the calibration piece based on a propagation time and a propagation distance of the ultrasonic wave reflected on the first end surface of the propagation portion of the calibration piece, and corrects the sound speed of the subject on the basis of the sound speed of the calibration piece, and
wherein the time axis is calibrated on the basis of a propagation time and a propagation distance of the ultrasonic wave reflected on the second end surface of the propagation portion of the calibration piece, and the sound speed of the calibration piece.

3. The ultrasonic inspection system according to claim 1, wherein the calibration piece includes at least two propagation portions, and at least one propagation direction changing unit disposed between the propagation portions,
wherein the propagation direction changing unit is configured to
include a slope inclined in a parallel direction to the surface of the piezoelectric element,
reflect the ultrasonic wave incident on the propagation direction changing unit from one propagation portion on the slope and emit the ultrasonic wave toward another propagation portion, and
reflect the ultrasonic wave incident on the propagation direction changing unit from the other propagation portion on the slope and propagate the ultrasonic wave toward the one propagation portion.

4. An ultrasonic inspection system, comprising:
an ultrasonic sensor which includes a piezoelectric element to transmit and receive an ultrasonic wave and a calibration piece; and
a control device which calibrates a time axis, including a propagation start time, on the basis of a propagation time of the ultrasonic wave propagating in the calibration piece and a sound speed of the calibration piece, and calculates a thickness of a subject on the basis of a propagation time of the ultrasonic wave propagating in the subject, based on the propagation start time, and a sound speed of the subject,
wherein the calibration piece includes
a propagation portion which extends along a surface of the piezoelectric element on a side opposite to the subject,
a first propagation redirecting portion which is formed on one side in an extending direction of the propagation portion, and is connected to the surface of the piezoelectric element through a contact medium,
a second propagation redirecting portion which is formed on the other side in the extending direction of the propagation portion, and is connected to the surface of the piezoelectric element through the contact medium,
wherein the first propagation redirecting portion is configured to include a first slope inclined in a vertical direction to the surface of the piezoelectric element, reflect the ultrasonic wave incident on the first propagation redirecting portion from the piezoelectric element on the first slope, and emit to the propagation portion, and
wherein the second propagation redirecting portion is configured to include a second slope inclined in the vertical direction to the surface of the piezoelectric element, reflect the ultrasonic wave incident on the second propagation redirecting portion from the propagation portion on the second slope, and emit the ultrasonic wave toward the piezoelectric element.

5. The ultrasonic inspection system according to claim 4, wherein the calibration piece includes at least two propagation portions, and at least one propagation direction changing unit disposed between the propagation portions,
wherein the propagation direction changing unit is configured to
include a slope inclined in a parallel direction to the surface of the piezoelectric element, and reflect the ultrasonic wave incident on the propagation direction changing unit from one propagation portion on the slope and emit the ultrasonic wave toward the other propagation portion.

* * * * *